US007629009B2

(12) United States Patent
Cunningham

(10) Patent No.: US 7,629,009 B2
(45) Date of Patent: Dec. 8, 2009

(54) HIGHLY SELECTIVE MOLECULAR CONFINEMENT FOR THE PREVENTION AND REMOVAL OF TAINT IN FOODS AND BEVERAGES

(75) Inventor: John Cunningham, Tracy, CA (US)

(73) Assignee: G3 Enterprises, Modesto, CA (US)

( * ) Notice: Subject to any disclaimer, the term of this patent is extended or adjusted under 35 U.S.C. 154(b) by 414 days.

(21) Appl. No.: 11/287,964

(22) Filed: Nov. 28, 2005

(65) Prior Publication Data

US 2007/0122523 A1    May 31, 2007

(51) Int. Cl.
*C12C 11/00* (2006.01)
(52) U.S. Cl. .................. 426/422; 426/387; 426/433; 426/592; 426/11
(58) Field of Classification Search .............. 426/422, 426/387, 423, 592, 11
See application file for complete search history.

(56) References Cited

U.S. PATENT DOCUMENTS

| 3,888,998 | A | | 6/1975 | Sampson et al. |
| 4,331,694 | A | | 5/1982 | Izod |
| 5,174,956 | A | | 12/1992 | Konishi et al. |
| 5,308,631 | A | | 5/1994 | Anglerot |
| 5,352,417 | A | | 10/1994 | Konishi et al. |
| 5,385,647 | A | * | 1/1995 | Brueschke et al. ............ 203/39 |
| 5,603,997 | A | | 2/1997 | Lindgren et al. |
| 5,750,611 | A | | 5/1998 | Trouilhet |
| 5,834,079 | A | | 11/1998 | Blinka et al. |
| 6,152,966 | A | | 11/2000 | Conrad et al. |
| 6,365,245 | B2 | | 4/2002 | Blinka et al. |
| 6,391,403 | B1 | | 5/2002 | Blinka et al. |
| 6,458,438 | B2 | | 10/2002 | Blinka et al. |
| 6,472,009 | B1 | | 10/2002 | Barrebi et al. |
| 6,610,342 | B2 | * | 8/2003 | Swan .................. 426/422 |
| 7,166,671 | B2 | * | 1/2007 | Wood et al. ............... 525/54.2 |
| 2002/0022075 | A1 | | 2/2002 | Swan |
| 2006/0073295 | A1 | * | 4/2006 | Angermaier ............... 428/35.7 |

FOREIGN PATENT DOCUMENTS

| DE | 407340 | 12/1924 |
| EP | 0 951 937 A1 | 10/1999 |
| EP | 1 466 833 A1 | 10/2004 |
| FR | 2 762 325 | 10/1998 |
| JP | 01005481 | 1/1989 |
| JP | 01005481 A | 1/1989 |
| JP | 6-227557 | 8/1994 |

(Continued)

OTHER PUBLICATIONS

English translation for JP 64-005481 published Jan. 1989. Inventors: Furuta et al.*

(Continued)

*Primary Examiner*—Anthony Weier
(74) *Attorney, Agent, or Firm*—Marshall, Gerstein & Borun LLP

(57) ABSTRACT

A means of preventing TCA taint from contaminating liquid foods and beverages is provided having of incorporating molecular sieves into the manufacturing process and/or packaging materials in order to selectively adsorb the taint molecules while preserving the food's or beverage's flavor and aroma profiles. Also provided are methods and devices for remediating TCA taint present in the consumer's liquid foods and beverages.

5 Claims, 5 Drawing Sheets

TCA Adsorption
Adsorbent Amount versus Si/Al Ratio

FOREIGN PATENT DOCUMENTS

WO    WO 03/068905 A1    8/2003

OTHER PUBLICATIONS

Andersson, "Degradation of Low Density Polyethylene During Extrusion-IV-Off-Flavor Compounds in Extruded Films of Stabilized LDPE," *J App Polym Sci* 95: 583-585 (2005).

Capone, "Absorption of chloroanisoles from wine by corks and by other materials," *Australian J of Grape and Wine Research* 5: 91-98 (1999).

International Search Report for International Application No. PCT/US2006/042932, dated Feb. 28, 2007.

Written Opinion for International Application No. PCT/US2006/042932, dated Feb. 28, 2007.

* cited by examiner

HIGHLY SELECTIVE MOLECULAR CONFINEMENT FOR THE PREVENTION AND REMOVAL OF TAINT IN FOODS AND BEVERAGES

BACKGROUND OF THE INVENTION

The present invention relates to methods for remediating food and beverage products contaminated with taint compounds which introduce undesirable flavors or odors into those foods and beverages. In particular, the invention relates to wine and the contamination of wine with 2,4,6 Trichloroanisole (TCA) which is also known as "cork taint." TCA imparts a moldy/musty odor to wine and is molecule produced by a metabolic reaction of mold organisms with chlorine and chlorinated compounds. TCA taint in wine is typically associated with cork, however, other media related with wine production and storage can also lead to TCA formation. While the human detection threshold for TCA is considered to be above 5 nanograms per liter (part per trillion) of wine it may be capable of suppressing the positive fruit aroma character in some wines at levels as low as two nanograms per liter. Damage to the wine industry worldwide from TCA taint is estimated to total $10 billion worldwide.

The food and beverage industry, especially wineries, need a cost effective and efficient method for preventing taint compounds from entering products during manufacturing, packaging, storage, and the distribution processes. A technology allowing end consumers to remediate foods and beverages immediately prior to consumption would also be beneficial. A number of solutions have been proposed to prevent products from becoming tainted and for the remediation of products already contaminated. These solutions have had limited acceptance principally due to the quantities of treatment material required, their costs, and their tendencies to change the flavor profiles of the products being protected or remediated. For example, technologies capable of removing TCA from contaminated products may also remove different desired compounds.

Zeolite technologies are among the tools applied to selectively remove molecules from various matrices. While there are numerous references regarding the adsorption of halogenated aromatics by zeolites, a literature search indicated there are no examples of zeolite adsorption of polychlorinated anisoles such as TCA.

Recently, Andersson et al. (J Appl. Polym. Sci. 95:583-595, 2005) placed a proprietary hydrophilic mixture of zeolites in low-density polyethylene films for use in food packaging. The zeolite was employed in this application to trap the degradation products of the polymer film preventing them from leaching into the food product. In the work of Andersson et al., the packaging film was the origin of the compounds that produce off-flavor in foods. The purpose of the zeolite in Anderson's technology was to retain these compounds in the film in order to minimize off-flavor effects. The ultimate goal of this work was to prevent the packaging material from influencing the aroma profile. A multitude of degradation compounds were targeted for adsorption instead of the focused targeting described in our novel approach.

Similarly, Trouilhet, U.S. Pat. No. 5,750,611 describes the use of molecular sieves to minimize the odors and flavors associated with thermoplastic films. Again, this technology focused on non-selectively retaining the odors and flavors that are created due to the polymer itself or breakdown products resulting from additives deliberately mixed into the polymer. These references do not describe a process in which the odors and flavors are selectively prevented from entering the food product but rather describe a technology in which a nondescript myriad of odor and flavor molecules are adsorbed.

Of interest to the present invention is a remedial treatment described in Swan, U.S. Pat. No. 6,610,342 which uses aliphatic synthetic polymers to remove off-flavors and odors from foods and beverages. This technology requires a comparatively large amount of synthetic polymer to remove a relatively small amount of taint. Swan's treatment calls for the use of roughly 150 grams of polymer to treat 1 liter of beverage. An example given for this technology describes the use of roughly 63 grams of an ultra-high molecular weight polyethylene (UHMWPE) to reduce TCA levels from 87.5 to 6.4 parts per trillion, in 0.75 liters of wine. The wine was filtered through a bed made up of the UHMWPE at a rate of 5 ml/min. The total filtration time for the 0.75 liters was consequently 2.5 hours. This translates to an average TCA removal rate of approximately 0.54 nanogram (ng) per minute and a capacity of 1.3 ng TCA removed per gram of treatment material. The novel technology described herein has taint removal capacities that are orders of magnitude larger than Swan's UHMWPE polymer. In addition, the presently described adsorbent technology removes these comparatively large taint amounts in seconds rather than in minutes or hours.

Another method used to remove taint from wine utilizes milk or the combination of milk and diary cream known as "half-and-half." The application of this technique has been approved by regulatory authorities in the past at a usage rate of 2 liters of milk or half-and-half per 1000 liters of wine. This method is stated to be capable of removing TCA without significantly changing the phenolic profile of the wine but no quantitative information regarding the aroma profile was provided. Half-in-half is said to perform better at removing TCA due to its higher fat content. Milk use at this rate is approved by the federal government (27 CFR 24.246 Materials authorized for treatment of wine and juice.) for the fining of specific types of wine. A usage rate for taint removal of 10 liters of milk or half-in-half per 1000 liters of wine has been proposed.

The capacity, selectivity, and speed of half-and-half for TCA removal have not been specifically reported for these studies and the efficacy of this method is unclear. Nevertheless, the addition of milk products to wine and the subsequent removal might be relatively expensive. Moreover, the use of milk products could also raise questions regarding the acceptability for consumption by individuals with allergies to dairy products.

Although the wine industry has made strides in minimizing the potential for TCA contamination, the problem remains. Accordingly, there remains a need for methods allowing for the fast, selective, and economical removal of TCA in a manner which do not remove other desirable components or otherwise change the contaminated product's flavor and aroma profiles.

BRIEF SUMMARY OF THE INVENTION

The present invention relates to the discovery that Zeolite-Y (Faujasite) molecular sieves are capable of selectively removing TCA from solutions including liquid food and beverage products (hereinafter collectively "beverage products"). In particular, the invention is directed to the use of Faujasite molecular sieves for the removal of TCA from wine and the discovery that TCA may be thus removed from wine without significant negative impacts on the desirable flavor and aroma components of wine.

While the invention is particularly directed to wine during its manufacture and storage the methods of the invention may also be used for the rapid and selective remediation of the raw materials used to make the beverage products, the intermediate products created during manufacturing, and the final products. Additionally, this technology is beneficial for direct incorporation into packaging materials, and package containers.

A particularly preferred Faujasite for use according to the invention is one having a silica-to-alumina (Si/Al) ratio greater than 5 with Si/Al ratios of 10 and greater being particularly useful according to the invention. Faujasites with compensating cations selected from the group consisting of hydrogen, ammonium, alkali metals (such as sodium), rare earth elements, and organic can be used for this tuning may be used according to the invention with $H^+$ and $Na^+$ Faujasites being particularly preferred.

The Faujasites may be used at various concentrations as determined empirically based on the level of TCA contamination of the beverage product and the composition of the beverage product itself. In general, concentrations of from 0.001 to 1 gram per liter have been found to be useful with concentrations ranging from 0.02 to 0.1 gram per liter of $H^+$ and $Na^+$ Faujasites being generally sufficient to remove TCA present in wine at concentrations approaching 500 ng/L.

TCA may be removed from beverages by the steps of mixing the molecular sieve with the beverage, incubating the sieve with the beverage, and then separating the molecular sieve from the beverage. According to one such method, the beverage is passed through a bed comprising the molecular sieve. At a point when the molecular sieve becomes saturated with TCA it can be regenerated by various means known to the art and then reused for purification of foods and beverages.

According to a further aspect of the invention, faujasites may be incorporated into closure or container devices as a prophylactic against new contamination as well as to remediate past contamination. In particular, the faujasites can be incorporated into a closure device such as a cork to remove TCA present in the closure device or otherwise in the beverage container.

The invention also provides devices such as sachets or dipsticks for the remediation of TCA contamination in a beverage comprising Zeolite-Y (Faujasite) having a Si/Al ratio greater than 5 in an amount effective to remediate TCA contamination in said beverage. The device can comprise a sachet or dipstick or can be incorporated into a beverage product's packaging.

The methods of the invention utilize the molecular sieve as a taint barrier or direct remediation product for the beverage product. The invention thus addresses the removal of taint from liquid foods and beverages in the production stages, the prevention of taint during the beverage product's distribution and provides methods for removing taint compounds from products immediately prior to consumption. The latter being especially important to consumers who have purchased expensive wines only to discover that the wine was tainted.

DETAILED DESCRIPTION OF THE INVENTION

Figure 1:
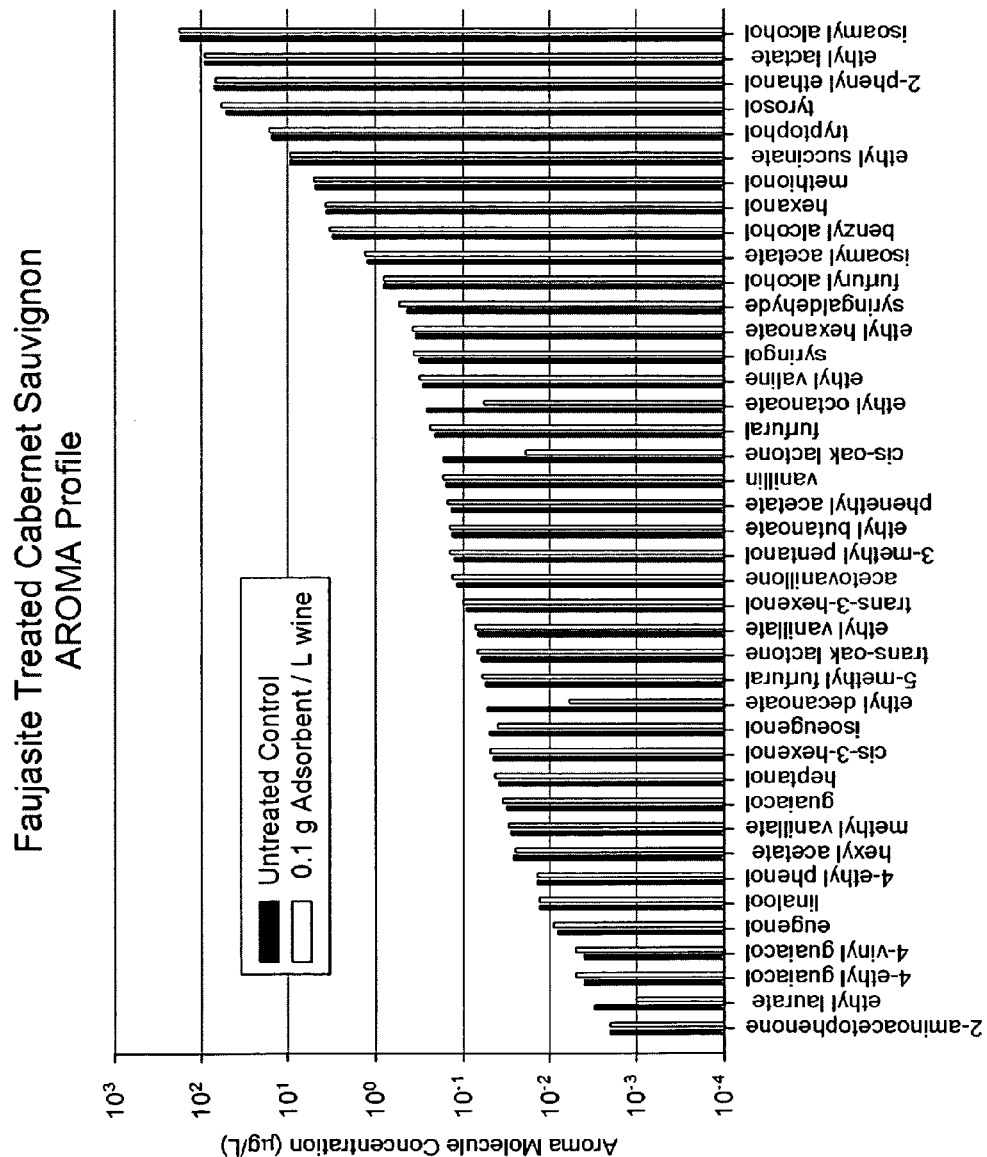
FIG. 1 is a bar chart comparing the aroma profiles of an untreated control with an $H^+$ Faujasite treated Cabernet Sauvignon: one, an untreated control sample; the second, an $H^+$ faujasite-treated sample.
Figure 2:
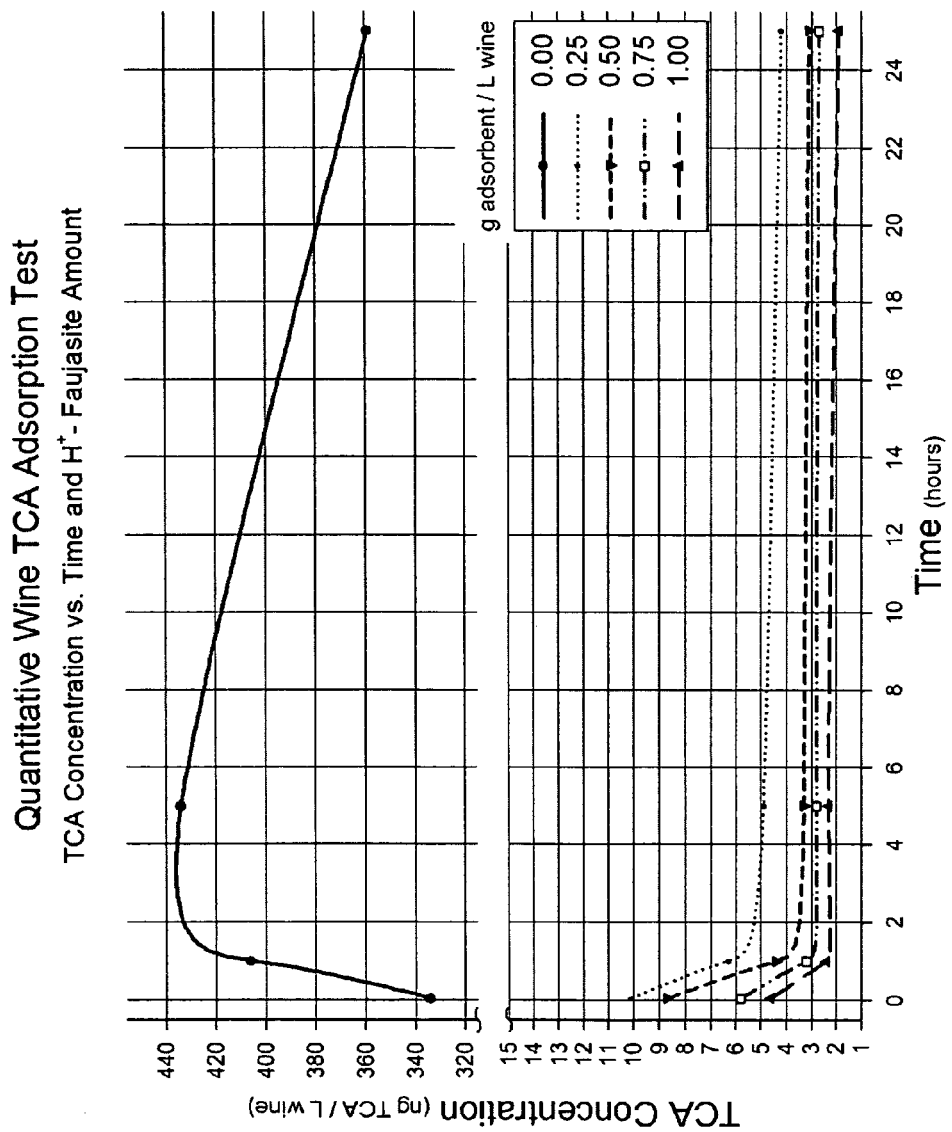
FIG. 2 is a two-dimensional graph depicting TCA concentrations in tainted wine over various contact times and amounts of $H^+$ Faujasite.

The invention provides the use of Faujasite molecular sieves for the selective removal of 2,4,6 Trichloroanisole (TCA) from beverage compounds. Zeolites are a class of molecular sieves that have a crystalline structure made up of aluminosilicates. The Faujasite molecular sieves of the invention have pore sizes less than 2 nm and are able to preferentially adsorb one or more molecules from a mixture by utilizing differences in various properties of the molecules. For example, molecules of differing sizes can be separated using a molecular sieve having pore sizes too small to allow access for the desirable molecules in a mixture but large enough for the undesirable molecules to enter. Other properties such as hydrophobicity and charge compensating cation related physical and electrical charges exist and can be exploited to produce physicochemical separation.

Crystalline molecular sieves with pores constructed of 8, 10, or 12 oxygen atoms are called small, medium, and large pore materials, respectively. The methods of the invention using large pore molecular sieves that possess hydrophobic tendencies have been successfully demonstrated. In order to capture taint molecules such as TCA, it has been found that large pore materials are necessary for their adsorption (medium pore materials have pore sizes that do not allow fast, effective adsorption). It has also been found that the molecular sieves need to be relatively hydrophobic in order to selectively attract the comparatively water insoluble TCA. Further, Faujasites characterized by Si/AL ratios above 10 are preferred.

The adsorbents of the invention can be employed in a variety of ways. For example, low concentrations of the selective adsorbent can be mixed directly into a contaminated beverage product and subsequently filtered out prior to packaging. In another configuration, the contaminated liquid could be run through a fixed bed of selective adsorbent preceding packaging. A particular advantage of zeolites is that they can be regenerated to remove adsorbed TCA and then reused. Those of ordinary skill would therefore recognize that a semi-continuous process could be carried out wherein active beds are used to remove TCA from a beverage while other beds are being regenerated. The regenerated beds can then be cycled into use upon exhaustion of the active "on-line" bed.

In a case where the beverage product also contained solids, this technology could employ the use of sachet or "stick" containing the adsorbent. The sachet or stick could be inserted into the tainted mixture of liquid and solids and allowed to contact the product for a sufficient time to remove the offensive molecules. Once the taint molecules were adsorbed, the sachet or stick would be simply removed. In all cases, the beverage product tainted prior to packaging would be suitable for further processing with minimal changes to their intended odor and flavor profiles.

A number of solutions have been proposed to prevent products from becoming tainted after packaging. Many of these technologies focus on taint compounds originating from the packaging materials themselves. Degradation products of molecules purposefully placed in the packaging material for some perceived benefit, such as oxygen scavenging, are typically the target. The methods of the invention can be used to prevent introduction into a finished product of both taint compounds found within the packaging materials and ubiquitous environmental taint molecules. The materials of the invention can also be fashioned to act as a remedial packaging component that removes taint from foods and beverages existing prior to or introduced during the packaging step. These adsorbents can be added to natural bark wine corks, agglomerated, composite, and synthetic wine corks, screw cap liners, packaging films, coatings, sachets and the like.

Finally, the methods and devices of the invention can be used to remediate beverage products at the product's site of consumption. A retail customer, for example, could remediate a tainted bottle of wine by dipping a device containing the molecular sieve into the liquid and swirling it around for a specified period of time. Another configuration of this type of remedial device could be a strainer containing a disposable insert securing the molecular sieve. Retail customers or restaurants could simply pour tainted wine through the strainer resulting in a taint remediated product.

EXAMPLE 1

According to this example, various commonly available zeolites were tested for the selective removal of TCA from wine. These zeolites included Zeolite Y (FAU), Beta (BEA), and ZSM-5 (MFI). In order to determine the adsorbent's efficacy, testing was conducted using commercially available red and white wines contaminated with TCA concentrations ranging from approximately 10 to more than 400 part per trillion. The treatment was performed by directly mixing the various zeolite powders into the contaminated wine, allowing the wine to contact the powders for a prescribed amount of time (from seconds to hours), filtering the wine to remove the zeolite, and analyzing the wine for TCA concentration. These concentrations were determined using either a sensory panel trained to detect and judge the TCA odor's intensity or a Gas Chromatograph Spectrophotometer (GCMS) Solid Phase Micro-extraction (SPME) method. Table 1 provides a qualitative indication of the removal efficacy of the three zeolite types along with silica to alumina (Si/Al) ratios and charge compensating cations.

TABLE 1

| Zeolite Structure | Si/Al Ratio | Cation | TCA Removal from Wine |
|---|---|---|---|
| BETA | 300 | $H^+$ | Poor |
| BETA | 150 | $H^+$ | Poor |
| FAU | 5.1 | $H^+$ | Good |
| FAU | 20 | $Na^+$ | Good/Excellent |
| FAU | 80 | $H^+$ | Excellent |
| FAU | 30 | $H^+$ | Good |
| FAU | 60 | $H^+$ | Good/Excellent |
| FAU/MFI | unknown | $Na^+$ | Poor/Good |
| MFI | unknown | $Na^+$ | None |
| MFI | 280 | $NH_4^+$ | None |

The faujasite zeolites performed best for this application, BEA was a distant second, and MFI showed no effectiveness. Unexpectedly, the faujasite molecular sieves performed well compared to the BEA sieves which had a similar pore opening size and a higher Si/Al ratio.

In conclusion, zeolites having a faujasite structure were successful in rapidly removing TCA from wine. Further, the performance of the faujasite appeared dependent on the amount of silica in relation to alumina in its framework. Specifically, faujasite adsorbents containing higher Si/Al ratios adsorbed more TCA from wine per unit of adsorbent applied.

EXAMPLE 2

According to this example, a qualitative test of TCA removal was conducted using various faujasites and a ZSM-5. Specifically, a sensory panel trained and skilled in identifying the relative intensity of the TCA odor in wine was used to carry out an initial qualitative testing. The samples for treatment and evaluation were made using a non-sorbated French Colombard wine spiked with TCA at concentrations ranging from zero to 280 nanograms per liter. The various adsorbents, at concentrations ranging from zero to 0.08 milligrams per gram of wine, were added to the respective sensory jars and mixed by shaking.

The experiment was designed to evaluate the various adsorbent's effectiveness at removing the TCA odor from the wine samples and to determine if the adsorbent appreciably changed the wine samples' aroma. To achieve this objective, some of the samples containing no TCA taint were treated with the adsorbent and several of the samples that were spiked with TCA received no adsorbent. The panel members were also given a control wine that was neither spiked with TCA nor treated with adsorbent, as a reference.

The panel members were instructed to rank the samples for TCA odor intensity and aroma reduction (scalping). The control wine was used to provide a baseline aroma level for the panel members to allow an evaluation (ranking) of the amount of aroma scalping that occurred in treated wine samples.

The sensory panel for this test consisted of five members. In order for a member's TCA intensity or scalping value to be counted, at least two of the five members needed to register a response. If two or more members recorded a response, the responses were averaged and recorded. The results are shown in Table 2.

TABLE 2

Qualitative TCA Removal Study- Wine

| | | | | | | Average Taint/Scalping[1] | |
|---|---|---|---|---|---|---|---|
| Adsorbent Structure | Compensating Cation | Silica/Alumina Ratio | Adsorbent Level (mg/g wine) | TCA Concentration (ng/L wine) | TCA Target Sensory Ranking (Panel; 0–7 scale) | TCA Sensory Ranking (0-no TCA, 7 - max TCA) | Flavor Scalping (0-no scalping, 7- no flavor) |
| FAU | $H^+$ | 80 | 0.08 | 0 | 0 | 0.00 | 0.00 |
| FAU | $H^+$ | 80 | 0.04 | 62.5 | 2 | 0.00 | 0.00 |
| FAU | $H^+$ | 80 | 0.08 | 250 | 4 | 0.00 | 0.00 |
| FAU | $H^+$ | 30 | 0.04 | 62.5 | 2 | 1.40 | 0.00 |
| MFI | $NH_4$ | 280 | 0.08 | 0 | 0 | 0.00 | 0.00 |
| MFI | $NH_4$ | 280 | 0.04 | 62.5 | 2 | 2.80 | 0.00 |
| MFI | $NH_4$ | 280 | 0.08 | 250 | 4 | 3.80 | 0.00 |
| none | — | — | 0 | 62.5 | 2 | 0.40 | 0.00 |
| none | — | — | 0 | 62.5 | 2 | 4.00 | 0.00 |

TABLE 2-continued

Qualitative TCA Removal Study- Wine

| Adsorbent Structure | Compensating Cation | Silica/Alumina Ratio | Adsorbent Level (mg/g wine) | TCA Concentration (ng/L wine) | TCA Target Sensory Ranking (Panel; 0–7 scale) | Average Taint/Scalping[1] | |
|---|---|---|---|---|---|---|---|
| | | | | | | TCA Sensory Ranking (0-no TCA, 7 - max TCA) | Flavor Scalping (0-no scalping, 7- no flavor) |
| none | — | — | 0 | 250 | 4 | 4.80 | 0.00 |
| none | — | — | 0 | 250 | 4 | 5.20 | 0.00 |

[1]Average of 5 Sensory Panel members. Criteria: minimum of 2 members required to respond prior to response being averaged.

The results shown in Table 2 demonstrate that the Faujasite adsorbent having a silica/alumina ratio of 80 performed well with respect to TCA removal without flavor scalping. No TCA aroma was detected by the panel from either the 62.5 or 250 ng/L samples treated with this zeolite. Further, no aroma scalping was detected in any samples.

EXAMPLE 3

According to this example, the quantitative change in the aroma profile of a H+ Faujasite treated wine was studied. A Cabernet Sauvignon was chosen for this work and a baseline aroma profile from forty-eight aroma molecules (shown in Table 3), commonly found in wine and deemed important by a number of winemakers, was determined using quantitative analytical methods. In the untreated wine, forty-one out of the forty eight aroma molecules were at detectable concentrations in the untreated wine.

TABLE 3

Aroma Molecules Evaluated 3-methyl pentanol
furfuryl alcohol
1-octen-3-ol
maltol
4-ethyl phenol
methyl guaiacol
geraniol
4-ethyl guaiacol
cis-oaklactone
2-aminoacetophenone
transpoaklactone
syringol
eugenol
isoeugenol
methyl vanillate
ethyl laurate
syringaldehyde
ethyl palmitate
phenylacetaldehyde
5-nethyl furfural
b-damascenone
guaiacol
ethyl vanillate
heptanol
vanillin
acetovanillone
ethyl decanoate
linalool
cis-3-hexenol
trans-3-hexenol
furfural
ethyl valine
phenethyl acetate
phenethyl acetate
hexyl acetate

TABLE 3-continued

Aroma Molecules Evaluated benzyl alcohol
ethyl butanoate
ethyl succinate
methionol
ethyl octanoate
ethyl hexanoate
isoamyl acetate
hexanol
tyrptophol
ethyl lactate
ethyl lactate
2-phenyl ethanol
isoamyl alcohol A one liter aliquot of the baseline Cabernet Sauvignon was extracted and prepared by adding 0.1 grams of H+ Faujasite powder having a Si/Al ratio of 80. The sample was then thoroughly mixed and the powder allowed to settle. Once settled, the treated wine was filtered through a glass fiber pad to remove the zeolite. From each filtered one-liter sample, 100 milliliters were extracted and delivered to the lab for aroma quantification. FIG. 1 presents the results of the aroma profiles of the zeolite-treated and untreated wine samples. As can be seen, the aroma profiles of the two samples are quite similar. These data support the qualitative results regarding the lack of aroma scalping found in Example 2. Out of the forty-one aroma molecules found in the baseline wine, only three (ethyl-octanoate, ethyl-decanoate, and cis-oak lactone) may have been reduced by an organoleptically significant amount.

EXAMPLE 4

According to this example, the capacity of an H+ Faujasite to remove TCA from wine and the rate of such removal was measured quantitatively. A sample of an untainted non-sorbated French Colombard wine was split equally with one half serving as a reference and the other half spiked with TCA at a concentration of 500 ng per liter (parts per trillion). Each bottle was shaken and allowed to sit for 24 hours before continuing with the experiment.

Five levels of the Faujasite powder (0.0, 0.25, 0.50, 0.75, and 1.00 grams per liter of wine) were evaluated for TCA-removal capability. Each treatment consisted of placing 75 ml of the 500 ng-TCA per liter-tainted wine into a 40-× 80-mm glass bottle containing the appropriate amount of adsorbent powder.

To determine the rate of TCA adsorption, aliquots of each treated wine were analyzed for TCA using GCMS/SPME after wine/adsorbent contact times of 0, 1, 5, and 25 hours. For the 0 hour contact time, the samples were immediately filtered through a glass-fiber filter pad to remove the zeolite powder. The filtrate was immediately placed into a 30 ml GC/MS headspace vial, tightly sealed with a septa cap and inverted 4 times. All of the treatments, including the no adsorbent sample, were filtered and prepared in this way. After preparing all of the headspace vials for the 0-time sample, the vials were quickly placed on the GC/MS auto-sampler for TCA analysis by SPME technique.

This sequence was followed for the 1-, 5-, and 25-hour samples. The results of this testing are depicted in FIG. 1 and indicate that the TCA removal occurred very rapidly after the application of the zeolite powders. The results indicate that an average of over 97% of the TCA was removed immediately. After this immediate, rapid removal, the TCA removal rate appeared to taper off and approach an asymptote over the 25-hour treatment period. The speed of TCA removal and the quantity removed were substantially higher than the rates and quantities removed using competitive remediation technologies. Even the lowest treatment amount of 0.25 gram per liter Faujasite removed over 310 nanograms of TCA per liter of wine.

EXAMPLE 5

According to this example, a test was carried out to quantify how well various adsorbent could remove TCA from wine without affecting the wine's desirable aromas. As with Example 3, forty-eight aroma molecules (shown in Table 4), commonly found in wine and deemed important by a number of winemakers, were selected for analyses.

TABLE 4

| Adsorbent | Si/Al Ratio | Adsorbent (g Adsorbent/L wine) | TCA (ng/L) |
|---|---|---|---|
| None | N/A | 0 | 20.40 |
| H+ FAU | 80 | 0.01 | 1.86 |
| | | 0.03 | 1.67 |
| | | 0.06 | 3.58 |
| | | 0.10 | 1.77 |
| | 60 | 0.01 | 4.93 |
| | | 0.03 | 3.97 |
| | | 0.06 | 4.01 |
| | | 0.10 | 1.80 |
| | 30 | 0.01 | 5.68 |
| | | 0.03 | 5.16 |
| | | 0.06 | 4.52 |
| | | 0.10 | 4.94 |
| | 5.1 | 0.01 | 14.90 |
| | | 0.03 | 12.12 |
| | | 0.06 | 10.51 |
| | | 0.10 | 8.97 |

Figure 3:
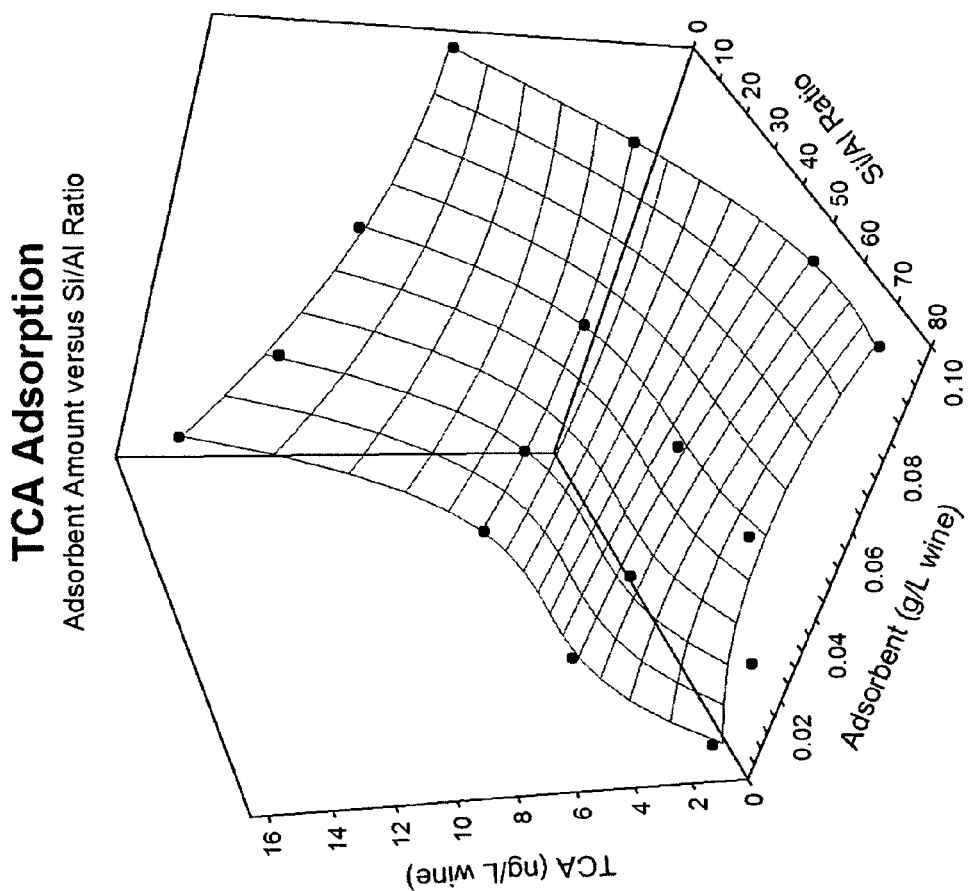
FIG. 3 is a three dimensional graph depicting TCA concentrations versus $H^+$ Faujasite Si/Al ratios and adsorbent concentrations.

An analysis of these results shows that Faujasite zeolites having Si/Al ratios greater than about 5 were superior in removing TCA from wine. The results also showed that the extent of TCA removal was impacted very little by the adsorbent concentrations as long as the Faujasite had an Si/Al ratio of 20 or greater (FIG. 3).

Of the 48 compounds deemed important to the aroma of wine, 30 were detectable in the French Colombard used in this study. Of these 30, six (6) appeared to be reduced in concentration due to the adsorbent additions (see Table 5).

TABLE 5

| | SI/Al Ratio | Adsorbent (g Adsorbent/L wine) | ethyl hexanoate | ethyl octanoate | hexyl acetate | phenethyl acetate | ethyl decanoate | b-damascenone |
|---|---|---|---|---|---|---|---|---|
| None | N/A | 0 | 1061 | 822 | 340 | 241 | 24.43 | 4.03 |
| H+ FAU | 80 | 0.01 | 1017 | 77 | 297 | 261 | 7.23 | 1.90 |
| | | 0.03 | 870 | 64 | 249 | 221 | 4.81 | 1.07 |
| | | 0.06 | 766 | 44 | 166 | 201 | 3.97 | 0.91 |
| | | 0.10 | 607 | 49 | 159 | 156 | 3.71 | 1.60 |
| | 60 | 0.01 | 1046 | 165 | 328 | 275 | 8.86 | 1.61 |
| | | 0.03 | 918 | 109 | 276 | 235 | 8.21 | 1.21 |
| | | 0.06 | 920 | 132 | 263 | 214 | 7.44 | 1.10 |
| | | 0.10 | 998 | 122 | 243 | 217 | 4.51 | 0.88 |
| | 30 | 0.01 | 1071 | 228 | 349 | 253 | 10.99 | 1.84 |
| | | 0.03 | 1044 | 184 | 292 | 210 | 11.28 | 1.46 |
| | | 0.06 | 943 | 163 | 258 | 198 | 8.83 | 1.18 |
| | | 0.10 | 890 | 173 | 242 | 172 | 9.61 | 1.82 |
| | 5.1 | 0.01 | 1086 | 622 | 325 | 235 | 16.45 | 3.67 |
| | | 0.03 | 1095 | 501 | 360 | 252 | 18.30 | 3.73 |
| | | 0.06 | 1144 | 413 | 360 | 253 | 11.66 | 1.97 |
| | | 0.10 | 1120 | 359 | 324 | 224 | 13.02 | 2.07 |

Faujasite adsorbents having Si/Al ratios ranging from 5.1 to 80 were used for this investigation with concentrations of adsorbents ranging from 0.01 to 0.10 grams per liter of wine. The samples were created as they were in the previous example, with the contact time and TCA spike concentration held constant at 24 hours and 20.4 ng/L, respectively. The analysis for the TCA and aroma molecule concentrations was performed using GC/MS methods with the TCA results shown in Table 4 below.

Figure 4:
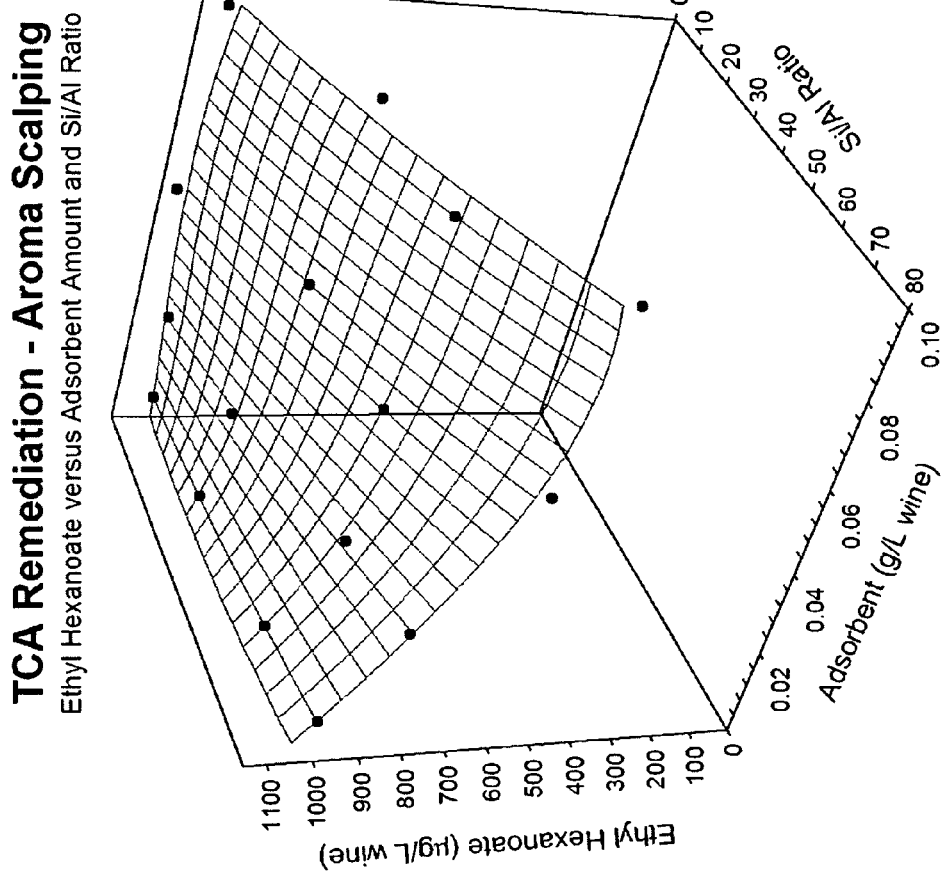
FIG. 4 is a three-dimensional graph depicting Ethyl Hexanoate concentrations versus $H^+$ Faujasite Si/Al ratios and adsorbent concentrations.

Out of these six compounds, the concentrations of the ethyl esters appeared to be reduced the most. The removal of ethyl hexanoate (a compound described as having a fresh fruity, pineapple odor) is graphed in FIG. 4 and illustrates how differently a desirable aroma compound was reduced in relation to the Faujasite's concentration and Si/Al ratio when compared to the extent of TCA reduction. Significantly, this difference in the removal response of the aroma compound versus TCA allows one of skill in the art to maximize the removal of TCA while minimizing the removal of a desired aroma molecule. Those of ordinary skill in the art would thus be able to compare the TCA remediation graph (FIG. 3) and the ethyl hexanoate removal response (FIG. 4) to determine adsorbent amounts and Si/Al ratios needed to optimize the retention of desired aroma compounds and the removal of undesirable flavor/aroma components.

Using the information from Example 5, this example demonstrates a mathematical modeling approach for minimizing the removal of agreeable aroma molecules while maximizing the removal of TCA by way of desirability profiling for multiple responses. Using JMP version 5.1.1 (a commercial statistical package created by SAS Institute Inc., 100 SAS Campus Drive, Cary, N.C. 2751302414), each aroma and TCA reduction was deemed a response potentially driven by the Si/Al ratio and Faujasite concentration factors. The aroma's desirability functions were set as targets of the original wine's aroma concentration, or set up as higher-the-better (HTB) when appropriate. The TCA's desirability function was set up as lower-the-better (LTB). Prediction profile plots for all aroma and TCA data were created along with their associated desirability functions and the overall desirability was maximized. A Is/AL ration of approximately 11 and adsorbent amount of 0.02 grams per liter was predicted "optimal" at the maximized overall desirability. Further, a theoretical reduction of TCA from 20.4 to below 2.5 ng/L (i.e., >87% TCA removal) was predicted while the aroma profile was substantially preserved. As can be seen in Table 6, the maximized overall desirability model resulted in good theoretical retention of the six adsorbent-sensitive molecule concentrations.

TABLE 6

| Desired Aroma Molecule | Untreated Control | H$^+$ Faujasite Treated |
|---|---|---|
| | all values in µg/L wine | |
| ethyl hexanoate | 1061 | 1087 |
| ethyl octanoate | 822 | 460 |
| hexyl acetate | 340 | 341 |
| phenethyl acetate | 241 | 244 |
| ethyl decanoate | 24.43 | 15 |
| b-damascenone | 4.03 | 2.95 |

Figure 5:
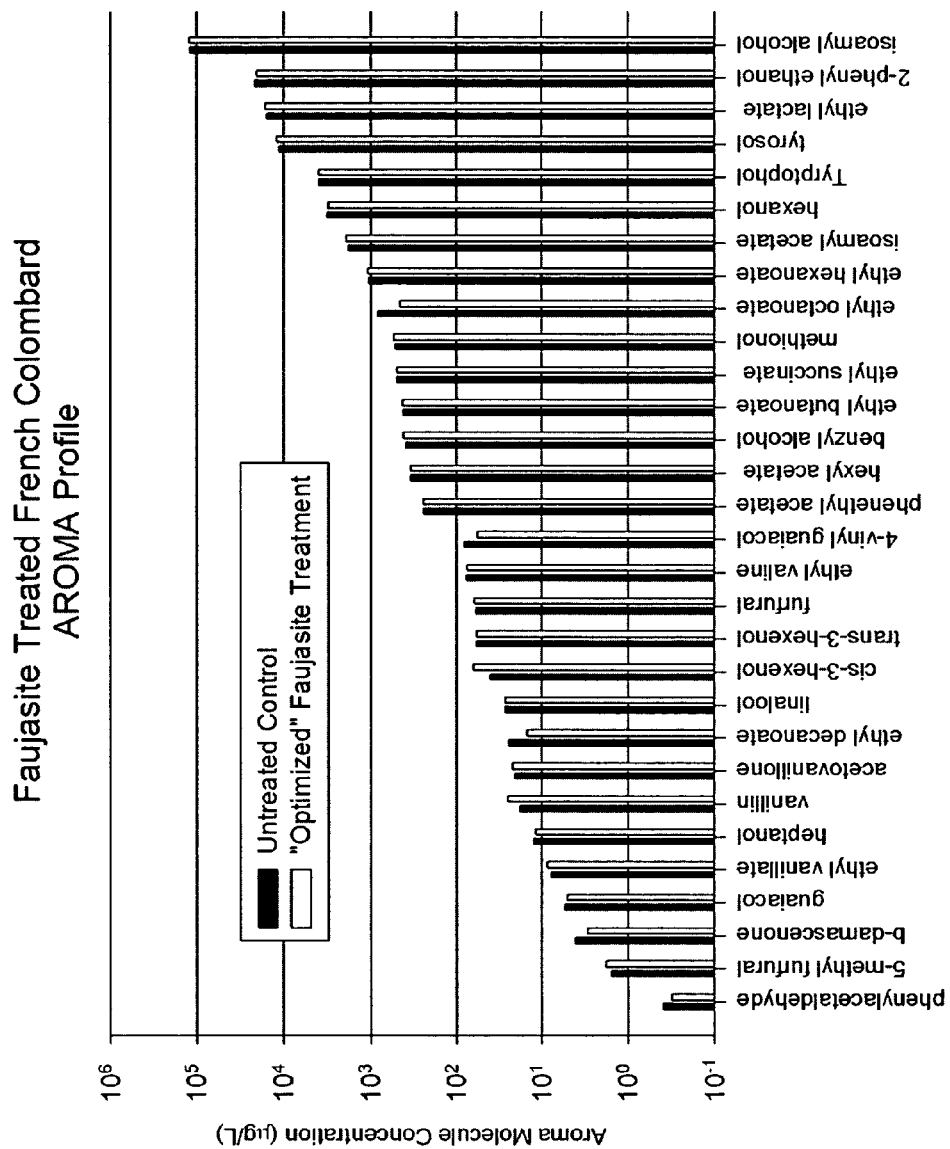
FIG. 5 is a bar chart depicting Aroma molecule concentrations in an untreated French Colombard control sample and a mathematically-optimized French Colombard sample treated with $H^+$ Faujasite.

Clearly, the combined use of zeolite adsorption differences between molecules and this multivariate technique can minimize the negative impact of the TCA-reduction treatment on the desirable aromas. The ability to maintain the product's original aroma profile is further illustrated in FIG. 5 where all 30 of the detectable aroma molecule concentrations in the French Colombard study are displayed for the untreated control and the multivariate-optimized Faujasite-treated wine.

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

What is claimed is:

1. A method for removing 2,4,6 Trichloroanisole (TCA) from a beverage without aroma and flavor scalping of components other than TCA comprising contacting said beverage with a molecular sieve which is a Zeolite-Y (Faujasite) having a Si/Al ratio of at least 5 wherein the beverage is wine wherein said Zeolite-Y is administered at a concentration of from 0.02 to 0.1 g of Zeolite per liter of wine.

2. The method of claim 1 wherein the molecular sieve has a Si/Al ratio of greater than 10.

3. The method of claim 1 wherein the Zeolite-Y is used at a concentration of from 0.001 to 1 gram per liter.

4. The method of claim 1 comprising the steps of mixing the molecular sieve with the beverage for a specified period ranging from seconds to hours and then separating the molecular sieve from the beverage.

5. The method of claim 1 wherein the beverage is passed through a bed comprising the molecular sieve.

* * * * *